Sept. 13, 1966 D. R. DUSTIN ETAL 3,273,120

ERROR CORRECTION SYSTEM BY RETRANSMISSION OF ERRONEOUS DATA

Filed Dec. 24, 1962 3 Sheets-Sneet 1

INVENTORS
DONALD R. DUSTIN
ROBERT V. McFADDEN
CHARLES P. RAUF
GILBERT G. UNGER

BY Bernard M. Goldman
ATTORNEY

ERROR CORRECTION SYSTEM BY RETRANSMISSION OF ERRONEOUS DATA

Filed Dec. 24, 1962 3 Sheets-Sheet 2

Sept. 13, 1966 D. R. DUSTIN ETAL 3,273,120

ERROR CORRECTION SYSTEM BY RETRANSMISSION OF ERRONEOUS DATA

Filed Dec. 24, 1962 3 Sheets-Sheet 3

United States Patent Office 3,273,120

Patented Sept. 13, 1966

3,273,120

ERROR CORRECTION SYSTEM BY RETRANSMISSION OF ERRONEOUS DATA

Donald R. Dustin, Salt Point, Robert V. McFadden, Wappingers Falls, Charles P. Rauf and Gilbert G. Unger, Poughkeepsie, N.Y., assignors to International Business Machines Corporation, New York, N.Y., a corporation of New York Filed Dec. 24, 1962, Ser. No. 246,707
10 Claims. (Cl. 340—146.1)

This invention relates generally to improving the reading reliability of digital data recorded on magnetic tape.

This invention relates particularly to means for error-correction digital data recorded on magnetic tape by retransmission of an erroneous data block with multi-dimensional error-detecting redundancy.

At times during the life of a recorded digital tape, one of more data bits on a reel of tape may be read with insufficient amplitude, due to splies, scratches, or minute particles of oxide which have become imbedded in the surface of the magnetic tape to shim the head away from that particular spot on the tape. This signal loss is commonly referred to as "dropout," which is defined as the condition in which the read amplitude of a bit is insufficient to actuate a sense register intended to receive the bit.

The "dropout" condition may be "total" or "marginal." A "total dropout" is a bit sensed with insufficient amplitude to actuate any sense register intended to receive digital data from tape. A "marginal dropout" (but not a "total dropout") can generally be recovered by a dual-channel sensing technique described and claimed in patent application Serial No. 671,834 filed July 15, 1957, now Patent No. 3,078,448 by Hugh O'Brien and assigned to the same assignee as the present application. Thus "total dropout" involves a read amplitude less than a "marginal dropout." The present invention may be provided to reinsert one or more bits which have "totally" dropped out of a track read from a block and which may or may not be recoverable by subsequent rereading passes without error correction. In many cases, bits which have been "totally" dropped out during a reading are not "permanent" errors, because such "totally" dropped out bits often can be restored by rereading passes without any electronic error correction. Such restoration of "totally" dropped out bits can be done by removal of a contamination on the tape surface causing the "total" dropout.

Thus recovery of "dropped out" bits from magnetic tape differs from error correction in other data transmission techniques. For example, a "totally dropped out" bit caused by a particle shimming away the tape from the head can often be recovered (without other error correction) by continuously rereading the data block having the error for a very large number of times (such as up to 100 times); whereby the rereading moves the tape back and forth (in a shoe-shine manner) by the head and a tape cleaning edge (if there is one), which in many cases can ultimately remove the offending particle from the tape and thereby eliminate the cause of the "dropout" error. However, in some circumstances the error cannot be corrected by this technique such as where signal dropout is due to splies, loss of magnetic coating on the tape at a particular point, or any permanent form of tape damage, i.e. caused in manually handling tape. In such case, the "dropout" can be referred to as a "permanent" error.

Errors caused by stray electromagnetic pickup of transmission lines connected to a magnetic-tape transport generally can be corrected by a retransmission, since it is unlikely that the same stray error will be again received during a retransmission. Generally pickup type noise from stray couplings is not a major source of error in tape transmission where the tape units and the receiving computer system are located at the same general location.

The reliability of digital data read from magnetic tape is extremely high compared to other types of data transmission, and at a minimum might involve only a single erroneous bit in $10^7$, or more, number of bits. Thus it is common not to have a single bit read in error on an entire reel of tape containing millions of bits of data.

This invention corrects "dropout" errors from tape by requiring a retransmission of the data block having the erroneous bit. Because of the rare occurrence of erroneous bits on tape, such error-correcting retransmission is generally expected to be rarely required. Hence the amount of computer system time lost by retransmission is very little, percentagewise.

The prior art shows error-correcting systems not requiring any retransmission but requiring expensive buffering systems for error-correction purposes at the receiver to eliminate the need for a retransmission. Such prior systems utilize multidimensional redundancy derived at the transmitting source which is stored at the receiver in buffering means along with the data. Such prior systems have the limitation of requiring an intermediate buffer storage prior to a computer main memory for storing an entire block of data resulting from any single transmission. Such buffer storage means at the receiver can cause either of two limitations, which are: (1) only fixed-length data blocks having a particular number of bytes or words can be handled by such buffering means, or (2) variable-length data blocks cannot exceed a maximum length determined by the buffer-storage capacity. Thus a tremendous amount of expensive intermediate storage capacity is required for the long data blocks of variable lengths of the type commonly used in present commercial magnetic tape digital data systems. Yet due to the relative rarity of errors read from magnetic tape, such expensive receiver buffer system for error correcting only rarely is needed for its intended use. Thus the saving in system time by elimination of retransmission is outweighted by the extra cost and other limitations imposed by such intermediate buffer storage.

It is therefore an object of the present invention to eliminate the need for data block storage at a receiver for error correcting one or more erroneous bits in a received data block.

It is another object of this invention to provide an error-correcting system for magnetic tape which can accommodate variable-length blocks of received data, regardless of how large the block of data is.

It is a further object of this invention to provide an error-correcting system for magnetic tape which is relatively inexpensive compared to prior error-correcting techniques.

This invention uses byte-redundancy and block redundancy summing circuits for discovering the existence of one or more errors in a block of data read from tape.

Upon the detection of any error, a rereading of the block is caused, which results in a retransmission of the data from the block. Prior to any rereading, the block-redundancy summation completed for each track in the block is transferred to a retention register to indicate which tracks of the block are in error. If any error indication occurred for the data block, it is backspaced to its beginning for a rereading. A new block-redundancy summation is made during each rereading to see (1) if the error is entirely removed from retransmitted data, or (2) if the number of tracks having an error are more than one. If no track is indicated to have an error, then no further rereading is necessary. However, if an error is indicated without plural tracks being indicated as having errors, the error-correction system of this invention comes into operation to correct any error obtained during the next reading, which generally is the final reading of the sequence. If more than one track is indicated as being in error, a rereading occurs without any attempted error correction; but such rereading is not wasted since the error source on the tape may be removed during such rereading by the repassing of the tape by the head and a tape cleaning device (if provided).

Under some conditions, error correction is permitted only if the first reading finds a single track in error; and no error correction is permitted even in such case if an error appears during the first rereading, which is indicative of the error source shifting from track to track.

The error-correction system used during the rereading (following a retention register indication of an error without plural track errors) involves the use of the byte-redundancy summing circuit to identify a small group of data containing the error as it is being transferred to a computer system. The track retention register indicates which bit in the byte is in error. The erraneous bit is corrected by a gate for the erroneous track which is activated by the coincidence of the retention register indication and the reading of the byte having a specific error indication.

If the rereadings should continue up to some designated large number, N, which is preferably 10 or more, without obtaining complete error correction of the retransmitted data, a halt can be provided to the tape operation so that another error-correcting technique may be tried.

The foregoing and other objects, features and advantages of the invention will be apparent from the following more particular description of the preferred embodiment of the invention, as illustrated in the accompanying drawings.

Figure 1:
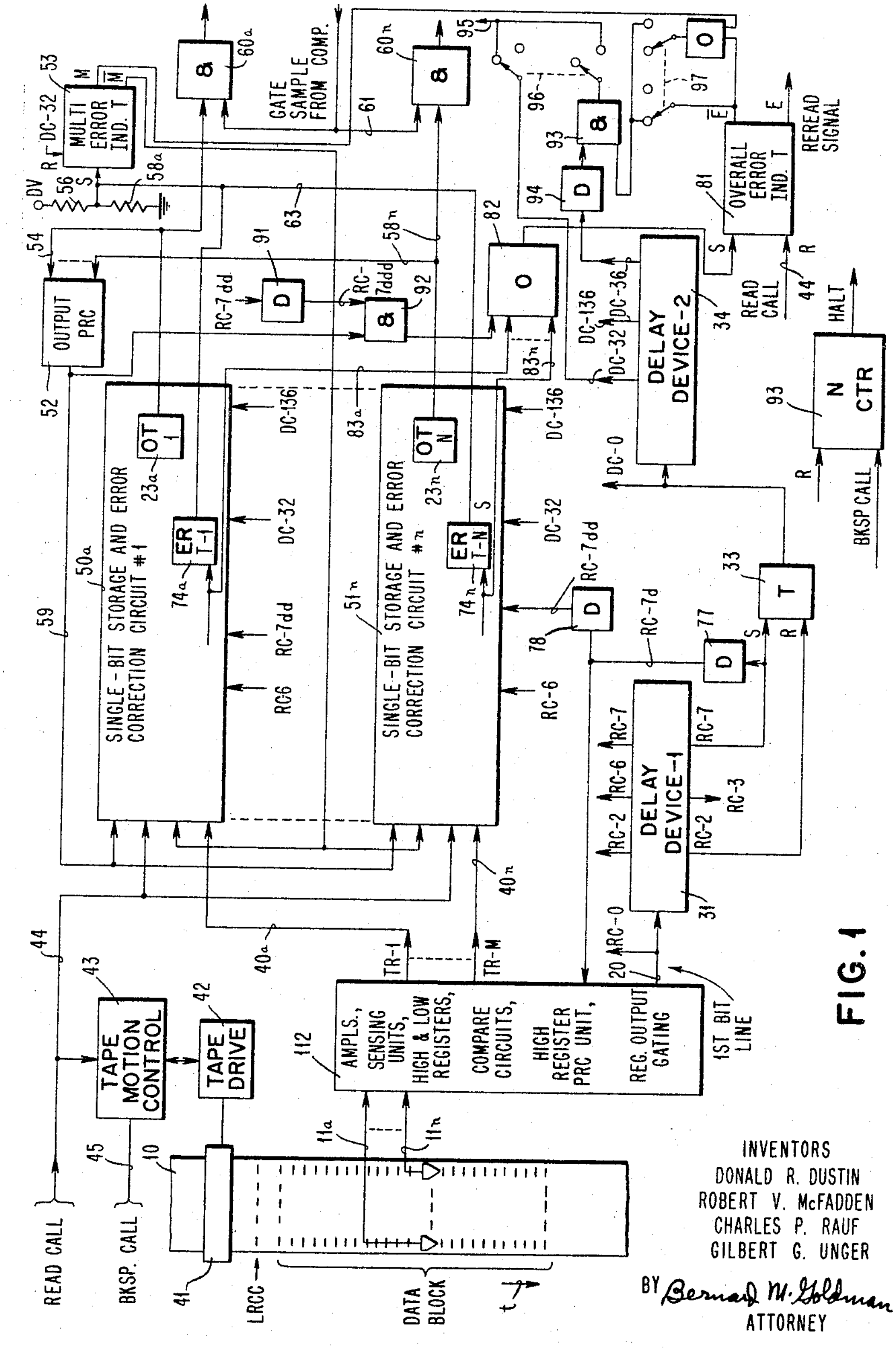
FIGURE 1 shows a system involved in the present invention.

In FIGURE 1 a tape 10 is shown having a data block recoded using *n* number of tracks on tape. A "longitudinal-redundancy check character" (LRCC) is recorded at the end of the data block. Thus there are *n* number of bit positions in the longitudinal redundancy check character (LRCC), each bit in the LRCC representing the result of a modulo-two summation of the "1" bits in its track within the block. A plurality of heads are provided for reading the respective tracks recorded on the tape. The heads read one data byte at a time. A data byte comprises the bits recorded in parallel across the tape at the same time. The bytes, however, may be skewed when read. Each byte also contains a redundancy check bit, which will hereinafter be called a parallel-redundancy check bit.

A tape drive 42 has a capstan-brake system symbolically represented by 41, which moves and stops tape 10. A tape control 43 controls the operation of the tape drive in response to calls (commands) provided from a computer system. Thus a "read call" signal on line 44 from the computer system to tape control 43 causes the tape drive to read a block of data. A "backspace call" on line 45 from the computer system to tape control 43 causes the tape to be moved backward by one block. Examples of tape controls, tape drives and computer systems for commanding such tape controls and drives by programmed instruction routines are found, for example, in the IBM 7090 System, which has a 7607 Tape Control for operating a 729 Tape Drive under program control. This transistorized Computer System has been in commercial use for several years and hence no detailed description will be provided for tape control 43 or tape drive 42. This specification will only be directed to a description of the novel features existing herein and only to so much of prior circuitry as is needed to connect up the novel features into a useful system that can be readily understood by one skilled in the art.

Figure 4:
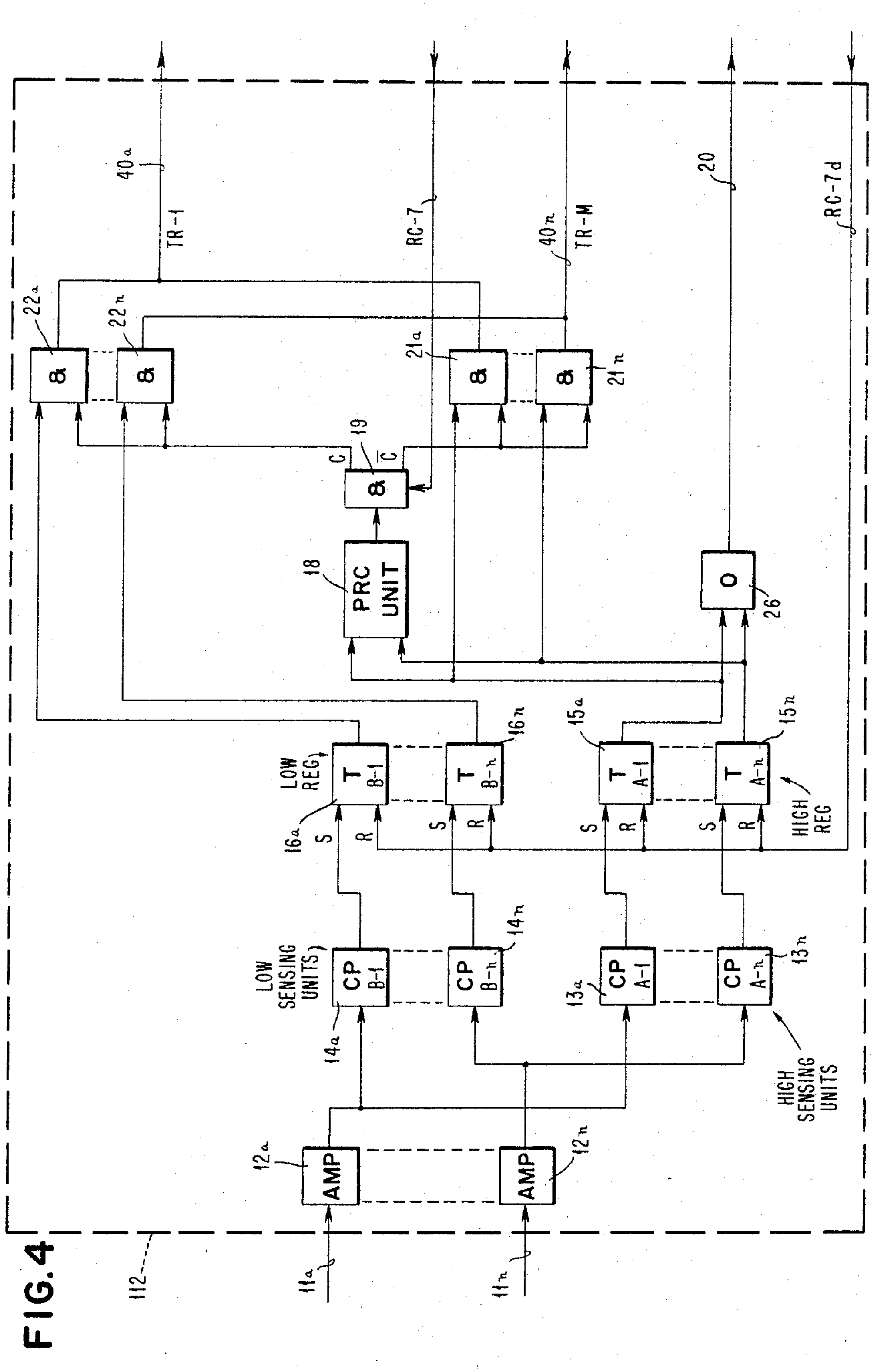
FIGURE 4 shows in detail another part found in FIGURE 1.

A plurality of transmission lines **11*a*–*n* respectively connect the read heads to a tape data transfer circuit 112 in FIGURE 1. A detailed form of transfer circuit 112 is shown in FIGURE 4 in which amplifiers 12*a*–*n* respectively receive data from transmission lines 11*a*–*n* that are connected to respective read heads. A low register (comprising triggers 16*a*–*n*) receives at set inputs the respective outputs of amplifiers 12*a*–*n* after they are passed through low-clip sensing units 14*a*–*n* that noise discriminate the data pulses read from tape. In a similar manner, a high register (comprising triggers 15*a*–*n*) have set inputs also connected to outputs of amplifiers 12*a*–*n* through high-clip sensing units 13*a*–*n***. The reason for the high and low registers is that this arrangement permits improved reliability in the accurate sensing of marginal amplitude bits read from tape. A more detailed discussion for the reasons for the low and high registers is given in U.S. patent application 671,834 cited above.

A parallel-redundancy check (PRC) unit 18 has inputs that respectively connect to the outputs of low register triggers **16*a*–*n*. PRC unit 18 comprises an Exclusive-OR circuit tree of the well-known type used for modulo-two summing of parallel bits, commonly used for parity redundancy checking (often called a vertical redundancy check unit. An AND gate 19 samples the output of PRC unit 18 at a time designated as RC–7. AND gate 19 provides complementary outputs C and $\overline{C}$ while it is being pushed by RC–7. If no error is indicated by unit 18 at time RC–7, the $\overline{C}$ output actuates AND gates 21*a*–*n* to sample the outputs of high register triggers 15*a*–*n* to output lines 40*a*–*n*. On the other hand, if a parallel parity error is indicated at RC–7 by unit 18, then output C actuates AND gates 22*a*–*n* to sample the outputs of low register 16*a*–*n* as the output on lines 40*a*–*n***.

A character gate actuating OR circuit 26 is provided which has inputs connected to the outputs of high register triggers **15*a*–*n*; wherein the first of any of triggers 15*a*–*n* to be set by a bit of a received byte provides an output from OR, gate 26 on lead 20 at a time RC–0 for actuating a delay device 31** shown in FIGURE 1.

After each first bit of a byte at time RC–0, delay device 31 shown in FIGURE 1 provides a sequence of differently delayed output pulses RC–2, RC–6 and RC–7. The output pulse sequence RC–0 through RC–7 occurs in less than one-half bit period for recorded tapes which do not have any synchronization bits recorded thereon. Delay device 31 is of the type which is often called a "read clock" in a tape control. It may comprise any of several different types of circuits well-known in the art, such as a sequence of single shots, a delay line, or a gated oscillator driven binary counter or ring.

A second delay device 34 is also provided which can be of the same general type of circuit as delay device 31. Delay device 34 is utilized for recognizing the end of a data block and for providing a sequence of delayed output pulses DC–32, DC–36 and DC–136, after the end of any data block has been recognized. Delay device 34 is actuated at time DC–0 by the output of a trigger 33 as long as it is in set condition, and device 34 stops operating and is reset when trigger 33 is reset. Trigger 33 is set. Trigger 33 is set by each RC–7 pulse from delay device 31, and is reset by the following RC–2 pulse from device 31 output. Delay device 31 cycles once of each byte read from a data block. Thus trigger 33 is first reset and later is set during any single cycle of device 31, so that trigger 33 is in set condition after each byte is read and can be reset only on response to the next following byte read from a tape data block. Hence as long as bytes occur regularly, as happens while they are being read from within a block, trigger 33 is reset shortly after it has been set in response to the previous byte. As a result, delay device 34 is reset in response to the reset of trigger 33 so that it cannot reach a count DC–32 as long as a next following byte occurs within a data block. However, when the last byte has been read from the data block, there is no reset immediately following for trigger 33 and hence delay device 34 is not reset and continues to ripple through its entire count sequence which then will provide pulses DC–32 to DC–136.

In FIGURE 1, a plurality of "single-bit storage and error correction circuits" 50*a–n* are provided, one for each track on the tape. Thus circuits 50*a–n* have respective inputs labeled TR–1 through TR–*n* corresponding to the respective tracks provided from the outputs of data transfer circuit 112.

Figures 2, 3:
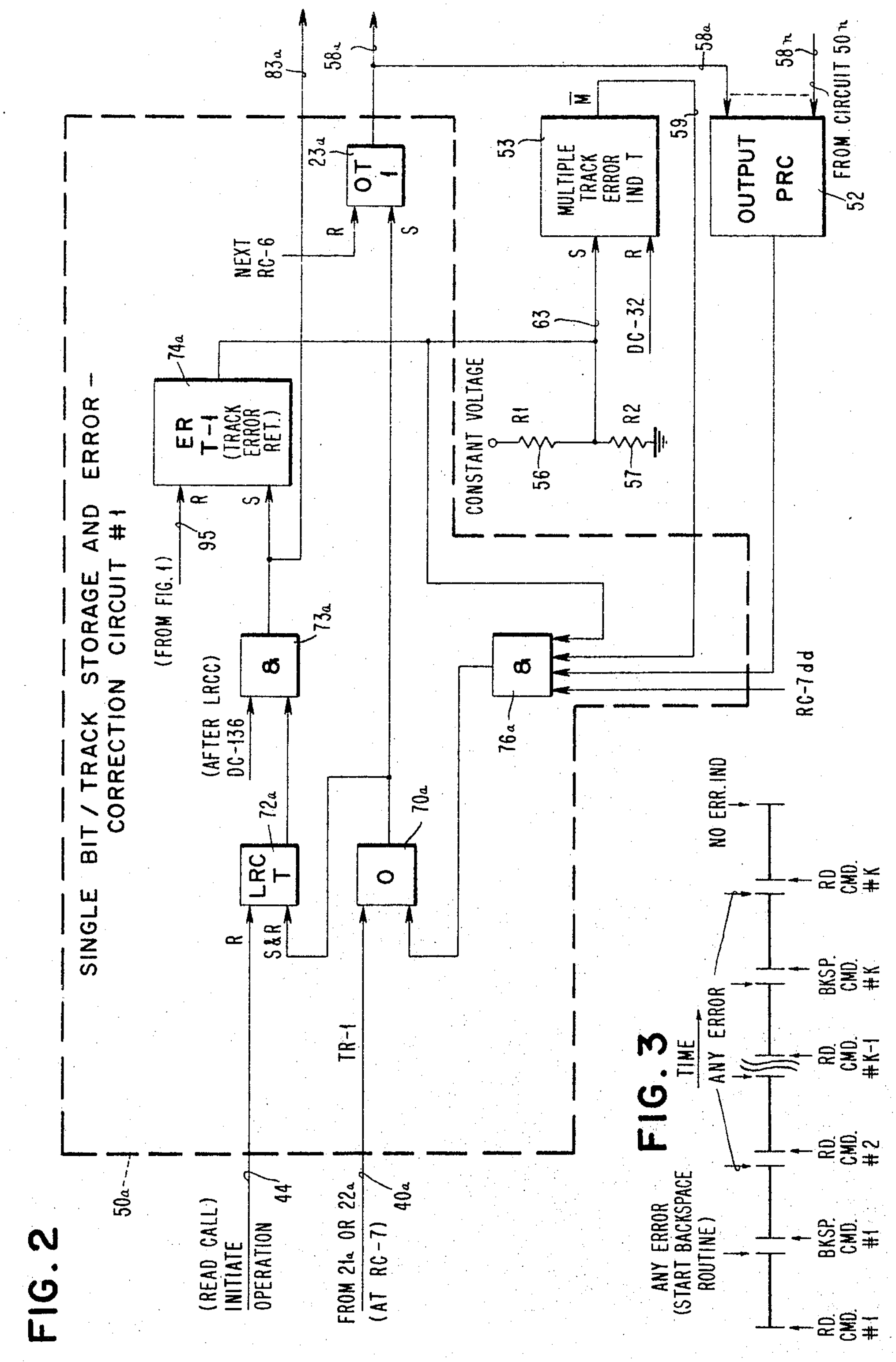
FIGURE 2 illustrates a detailed part of the system shown in FIGURE 1.
FIGURE 3 represents a retransmission sequence involved in this invention.

FIGURE 2 shows circuit 50*a* in detail. Each of the circuits 50*a–n* is identical to 50*a*. Thus 50*a* has an input lead 40*a* which provides the data from track 1 as sampled by gate 21*a* or 22*a* from register trigger 15*a* or 16*a*, depending upon whether or not a PRC error was indicated by unit 18. Also line 44 is an input to each circuit 50*a–n* for signalling the initiation of reading a data block from tape.

Each of circuits 50*a–n* contains storage for a single bit, which is provided by an output trigger 23*a* that can receive a bit at time RC–7 from an OR circuit 70*a* connected to line 40*a* (see FIGURE 2). Trigger 23 is reset by pulse RC–6 generated in response to the next byte.

OR circuit 70*a* has a second input connection from AND gate 76*a*, which (under special circumstances explained herein) provides an input pulse only if a "bit" pulse should have been reecived on lead 40*a* but was not received due to a "dropout" error in reading the tape.

In FIGURE 1, an output parallel-redundancy check (PRC) circuit 52 receives as inputs all of the outputs of triggers 23*a–n*. The output of PRC circuit 52 is provided as an input to AND gate 76*a*.

As shown in FIGURE 2, circuit 50*a* includes an LRC summing trigger 72*a* which is a binary trigger with a set and reset (S and R) input that receives each of the "1" bits provided from OR circuit 70*a*. Trigger 72*a* provides a modulo-two summation of all "1" bits received from OR circuit 70*a*. A summation by trigger 72*a* is not complete until after the entire block and its LRC character has been read. Trigger 72 is initially reset prior to reading a block by a "read call," and it should register a summation of "0" output after the reading of the entire block and the LRC character, if even redundancy is used, and if there is no single bit or odd number of bit errors in the track.

The timing for an output pulse DC–136 from delay device 34 is such that it cannot occur until shortly after the LRC character is read. Hence an AND gate 73*a* which receives the output of trigger 72*a* does not sample a redundancy summation by trigger 72*a* until after that summation is complete at time DC–136. If an error is indicated by a "1" condition of trigger 72*a* after the end of a block, a pulse results from the sampling by gate 73*a*. If a no error "0" condition results, no pulse is provided by gate 73*a* at time DC–136. Consequently, an error-retention (ER) register trigger 74*a* is set by the output of AND gate 73 only if an error was found in the respective track during a reading of the block.

If there is no error in any track, trigger 74*a* is reset by either DC–32 or delayed DC–136, one of which is chosen by a switch 96 in FIGURE 1, for reasons explained later in this specification. The set input to overall-error indicating trigger 81 is provided from an OR gate 82 which has inputs 83*a–n* respectively connected to the outputs of AND gates 73*a–n* (that connect to the set inputs of triggers 74*a–n*). Also, the output of PRC 52 is provided to OR circuit 82 by an AND gate 92. Thus at end of block time DC–136, trigger 81 will be set if any LRC trigger 72*a–n* contains a summation showing an error in any track, or if an output PRC error was found. If at time DC–136, no error in the block read is indicated by trigger 81, its output E remains down to signal the computer that the reading of the block into the computer memory was correct and that no rereading is required.

A second type of error indication used herein is provided by a multi-error indicating trigger 53, which indicates when there was an error in more than one track during the reading. Output $\overline{M}$ is provided from trigger 53 to an input of AND gate 76*a* (see FIGURE 2) to inhibit its operation if more than one track is indicated to be in error by more than one retention trigger 74*a–n*.

These two types of error indications are used for two purposes. Overall error indicating trigger 81 determines if a data block should be reread (rereading is done if any error was noted in the block). Rereading of a block continues as long as trigger 81 indicates an error at the end of each reading of a block. However, multi-error indicating trigger 53 determines whether or not the error-correcting circuits in this system shall be used during any particular rereading. Thus if errors are indicated in more than one track during any particular reading, the error-correcting circuitry 50*a–n* is inhibited during the next rereading by the output $\overline{M}$ from trigger 53, inhibiting AND gates 76*a–n* which perform the error-correcting function. However, if an error is indicated by trigger 81 but no plural errors are indicated by trigger 53 after any reading of a block, then the error-correcting circuitry is operated during the following rereading.

The operation of the invention during any reading with error correction uses: (1) the output of PRC circuit 52 during the rereading to identify any byte of parallel data having the error, and (2) the track-error indicating output of that one of error-retention triggers 74*a–n* to identify the bit position in error within the byte identified by the PRC output, since each track has only a single bit in a byte. The output of each of triggers 74*a–n* provides an input to that gate 76*a–n* within the respective circuit 50. Hence only that one of gates 76*a–n* is enabled which corresponds to that track indicated to have an error during the prior reading; and this one of gates 76*a–n* is enabled during the rereading, all other of gates 76*a–n* being disabled by their respective trigger 74*a–n*.

During the rereading, the bytes are read one after the other, and the bits of each byte are deskewed when they are transferred by a character gate (RC–7) from triggers 15 or 16 to triggers 23. Deskewing occurs due to the simultaneous transfer of all registered bits in the byte. As soon as each byte is registered in register 23 and before the next byte is read from tape, the output from PRC unit 52 to each gate 76*a–n* will indicate if the byte registered in triggers 23 contains an error. The output of PRC unit 52 is not reliable, however, until completion of the byte transfer to triggers 23*a–n* and before their reset by the next RC–6 pulse. The time of pulse RC–7*dd* is determined to be within this reliable period for the PRC output. The delay between RC–7 and RC–7*dd* is determined as follows: the data bits of a byte are received by leads 40*a–n* at time RC–7. However, the output of PRC unit 52 cannot be reliably brought up until after the bits have been delayed by circuits 70*a–n*, registration in triggers 23*a–n*, and in PRC unit 52. The delay of circuits 77 and 78 is slightly greater than the delay of circuits 70, 23 and 52.

Therefore, an output from that one of gates 76*a–n* in that one of circuits 50*a–n* corresponding to the track having the erroneous bit is provided at time RC–7*dd*. The pulsed output from that one of gates 76*a–n* passes through the respective OR gate 70*a–n* to set that one of triggers 23*a–n* which did not receive a bit due to a dropout error from tape. The type of transmission error assumed herein is a dropout type of error from magnetic tape, which manifests itself by a failure of one of output triggers 23*a–n* to be set. Accordingly, the erroneous track will have its dropout error corrected at time RC–7*dd* by the setting actuation then provided to that one of triggers 23*a–n* corresponding to a track having the erroneous bit in the byte.

Also the reinserted bit generated by one of gates 76*a–n* is provided to the respective one of LRC triggers 72*a–n* so that the redundancy summation for the erroneous track will reflect the corrected bit (or bits) during a rereading with error correction. Hence, if the reinserted bit results in a total correction of any error in that track, the LRC summation for that track will not indicate any error at the end of the rereading, even though the source of the error may still exist on tape. If at the end of such error-correcting rereading, no other track shows an error, no further rereading will be required. However, there are circumstances in which further rereadings will be required such as where the source of error in one track (a loose grain of oxide) has shifted to another track during the rereading to allow the original track to be without error but to bring up a new error check in the other track, which did not have its one of gates 76*a–n* enabled because its one of triggers 74*a–n* did not have an error indication during the prior reading. Accordingly, the fact that error correction is used during a rereading does not necessarily mean that a corrected block always must result from that rereading. All retention triggers 74*a–n* and multiple-track error trigger 53 are reset at the end of a block by either pulse DC–32 or a delayed DC–136 and overall error trigger 81 was previously reset by "read call" for the rereading.

Thus at the later time DC–136 which occurs after completion of rereadings of the block and after the LRC summation by triggers 72*a–n*, the sampling by gates 73*a* will actuate the overall error trigger 81 and signal a rereading if any error was indicated by any trigger 72*a–n* or by PRC 52 after error-correction, where needed, of any byte being corrected. Accordingly, the PRC output is also provided through OR circuit 82 to the set input of overall error trigger 81. However, this PRC output is sampled only after any bit corected by any of gates 76*a–n* has had time to effect the output of PTC 52, due to very slight delays through circuit 70, trigger 23 and PRC unit 52. For this reason, delay circuit 91 is provided to delay pulse RC–7*dd* slightly greater than this amount; and the output pulse RC–7*ddd* of circuit 91 is applied to an AND gate 92 to sample the output of PRC unit 52 after any correction has been made. Thus if a new error developed in another bit position of a byte, the correction of one of its bits by one of gates 73*a–n* would not prevent an error indication from PRC 52 being applied to overall error trigger 81, which would call for another rereading.

Each time a byte is registered in output triggers 23*a–n*, a demand is made to a computer system by well-known means not shown, which causes a sample pulse on a line 61 generated in response to a request for the byte from the computer system so that the byte in triggers 23*a–n* is sampled by gate 60*a–n* for transfer to the computer at that time.

All bytes received by output triggers 23*a–n* during any rereading (whether with or without an error) are transferred to the memory of the computer system. Whenever an error indication is provided after the end of a block by overall error indicating trigger 81, the computer is signaled not to use the data block previously received, so that it can be reread and stored again in the computer system. Thus the block is newly stored after each rereading until a rereading occurs without any error indicated by trigger 81, which indicates to the computer system that the block which it had received is correct and that it can go on to its next instruction, or otherwise processes the block data.

Three different scopes of error correction are provided herein. They are: (1) "restrained" error correction, (2) "confined" error correction, and (3) "restricted" error correction. "Confined" error corection provides an error-correcting rereading whenever the prior reading or rereading indicates only a single track in error. However, "confined" error correction permits a possibility (even though slight) of an uncorrected error during an error-correcting rereading due to an error source shifting from one track to another during the error-correcting rereading. However, this cannot occur under the "restrained" error correction which allows an error-correcting rereading only if during the first reading of a block a single track in error is indicated and that track error indication does not change during the following error-correcting rereading.

If a track error shift occurs under "restrained" error correction, the error-correction circuits are inhibited during following rereadings by the multiple-track-error indicator 53 until a rereading occurs with no error indication, or until a maximum number N of rereadings has occurred without an errorless rereading to halt operation.

A double-pole double-throw switch 96 is provided to select between "restrained," "confined" and "restricted" error correction. A second switch 97 selects between "confined" and "restricted" error correction. Switch 96 is shown in a position which provided "confined" error correction by providing (in FIGURE 1) each DC–32 pulse to lead 95 as a reset to error retention triggers 74*a–n* (see FIGURE 2). Pulse DC–32 occurs at the end of each data block before the LRC byte to wipe out all prior error indications in retention triggers 74*a–n* prior to a new setting of triggers 74*a–n* to the LRC summation by triggers 72*a–n* found at time DC–136, which occurs after the LRC byte has completed the LRC summations in triggers 72*a–n*.

However, for "restrained" error correction, switch 96 provides a reset to triggers 74*a–n* only after a reading or rereading without any error indication. Switch 97 is in the position illustrated in FIGURE 1 for "restrained" error correction. Thus pulse DC–136 of delay device 34 in FIGURE 1 is provided through a delay circuit 94 to an AND gate 93, which is enabled only by a no error indicating output $\overline{E}$. Circuit 94 provides a delay exceeding any delay by circuits 73, 82, 81 and 93.

As long as any error is indicated by trigger 81 under "restrained" error correction after a reading or rereading, no reset is provided to retention triggers 74*a–n*; and they retain track error indications of prior readings with any new track error indication being added thereto. Accordingly, if a first reading of a block provides a single track error indication, an attempted error correcting rereading results. During that attempted error-correcting rereading, a number of circumstances can happen which prevent error correction, such as if error source shifts to another track, or it shifts in the same track to cause an even number of errors which would not be indicated by the new LRC summation, or shifts in any track to change an even number of errors to an odd number to bring up a new track error indication. Under these new error-indicating circumstances, error correction is inhibited in further rereadings when an error indication appears in a second track, since the error indication of the first track continues to be retained. Then output $\overline{M}$ of multiple indicator 53 inhibits each of gates 76*a–n*. However, error-correcting rereading attempts will continue during "restrained" error correction as long as any error indication is found after any rereading with error correction, where a single track error indication does not change after any rereading.

"Restricted" error correction has a scope intermediate "confined" and "restrained" error correction. In the case of a shifted track error indication, "restricted" error correction prevents error correction during the next rereadings, but will allow error correction on the next following rereading if a single track is indicated then to be in error. This follows the theory that a shifting track error may shift again and the rereading following a shift should not have any error correction.

"Restrained" correction is obtained in FIGURE 1 by providing both switches 96 and 97 in opposite positions from those shown. Then a reset on line 95 is provided by a delayed pulse DC–136 after a rereading if a multiple error is indicated by output M from trigger 53. Also the no error output $\overline{E}$ is dot ORed with output M to provide a reset pulse on lead 95 if either a multiple error or no error exists.

Thus in operation with "restricted" error correction, if a first block reading indicates one track in error, one of retention triggers 74*a–n* is set, and no reset is provided to retention triggers 74*a–n* for the resulting rereading with error correction. If a shifted track error occurs during the rereading, another of retention registers 74*a–n* is set (which occurs at DC–136 before delayed DC–136), to set multiple error trigger 53, which provides an output M through switch 97 to gate 93 to enable a reset of retention triggers 74*a–n* which prevents any of gates 76*a–n* from operating during the next rereading. The next rereading is caused by output E due to the error indications. If after the next rereading (which had no error correction), only one of triggers 74*a–n* is set to indicate a track error, another rereading is indicated with error correction, since multiple error trigger 53 will not be set and will not provide a disabling output $\overline{M}$ to gates 76*a–n*. If no error was indicated, no next rereading would result due to output E of trigger 81 being down. Consequently, one rereading without error correction must intervene before a rereading occurs with error correction for the case of the shifted track error.

The system is initially programmed to permit up to a large number of rereadings N as long as an error indication is provided from trigger 81 at the end of the reading of each block. However, the number of rereadings in any cycle of rereadings caused by error indications will be greatly reduced in most cases due to this invention because generally the rereadings cease after errors are reduced to a single track. Then the system can proceed to read the next block if instructed to do so. FIGURE 3 indicates the matter of programming involved. Thus an initial read command (R. D. CMD.) #1 is shown which results in an initial reading of a block of data on tape. If an error is indicated at the end of the first reading, a sub-program is signaled by the output of overall error indicating trigger 81 after DC–136; and the sub-program (BKSP. CMD.) #1 followed by read command #2 which causes the first rereading of the block. If any error indication exists at the end of a rereading, then it is followed by a further backspace command and read command until a read command is executed without any error, which ends the rereading sequence after the #K reading that indicates no error. Thus K can be one or any number of readings, but a maximum limit of N number of readings is programmed to stop the tape operation. N is preferably a large number such as 100 rereadings. Of course, there will be no rereadings if no error has been indicated after the initial reading; and if there is an error after the initial reading, it is possible that there will be only a single rereading since after such rereading perhaps no error will be indicated to terminate the rereading cycles. The tape drive operation will be halted after N rereadings only if there are "permanent" errors in more than one track, since "permanent" errors detectable in one track of a block will be corrected during a rereading.

A counter 93 in FIGURE 1 controls the maximum number N of rereadings allowed for a block of data before it is considered not correctable. Counter 93 is reset at its input R upon the first reading of a block. It is incremental by one for each rereading in a sequence of rereadings. If a corrected block output is provided before the counter reaches N, no halt output will be provided. If the number of rereadings reaches N (which may be 100), a halt output is provided at count N to the operation of the tape drive having the faulty tape. The computer system need not necessarily be halted since it may have other tape drives which can operate independently. Counter N can be considered symbolic for counter to N by a computer using a subroutine program to accomplish the same purpose.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A system for correcting a digital data output read from tape comprising:

means for determining the existence of an error in the reading of a tape data block, means for retaining a track-error identification for each tape track in said block for errors found during a preceding reading, means for rereading said tape block in response to the detection of an error in said block during the prior reading, means for registering each byte read from the block, error-detection means for checking each byte received by said registering means, gating means connected to and actuated by said registering means for reinserting a bit in any respective track output having an error indicated therein by said retaining means prior to the reception of the next byte by said registering means.

2. A system as defined in claim 1 further comprising:

multiple-track-error indicating means receiving outputs from said retaining means, and block rereading control means responsive to an output from said multiple-track-error indicating means for inhibiting said gating means during at least the next rereading of said block.

3. A system for correcting a digital output read from tape as defined in claim 2 including means for inhibiting any further rereading of said block in response to no error indication during the last reading of said block.

4. A system as defined in claim 1 including means for terminating any further rereadings after a rereading not having an error indication, and means for accumulating track-error indications due to said longitudinal-redundancy summations during successive rereadings.

5. A system as defined in claim 4 including counting means for counting up to N number of rereadings, and means for halting the operation of said tape reading means in response to said counter reaching the count N with an error having been detected during the last rereading of said block.

6. A system as defined in claim 1 for restricted error correction further comprising:

multiple track-error indication means responding to plural indications by said retaining means, and means for resetting of said retaining means after any rereading with a multiple track error indicated.

7. A system as defined in claim 1 further including: means for requiring at least one rereading of said block without any error correction before permitting a rereading with error correction in response to an indication of a track error shift.

8. A system as defined in claim 1 further including: means for inhibiting said coincidence means during any rereading following a reading with error indications by more than one of said storing means.

9. A system as defined in claim 1 further comprising: means for resetting said retaining means in response to any reading without an error indication.

10. A system as defined in claim 9 further comprising means for inhibiting said resetting means after any reading with an error indication.

References Cited by the Examiner

UNITED STATES PATENTS

| | | | |
|---|---|---|---|
| 2,653,996 | 9/1953 | Wright | 178—23 |
| 2,913,707 | 11/1959 | Goldberg | 340—174 |
| 2,944,248 | 8/1960 | Auerbach | 340—146.1 |
| 2,977,049 | 2/1961 | Bloch | 235—153 |
| 3,183,483 | 5/1965 | Lisowski | 340—146.1 |

ROBERT C. BAILEY, *Primary Examiner.*

M. LISS, *Assistant Examiner.*